(12) United States Patent
Moody

(10) Patent No.: US 7,574,858 B2
(45) Date of Patent: Aug. 18, 2009

(54) METHOD OF AND SYSTEM FOR HEAT RECOVERY FOR AN INTERNAL COMBUSTION ENGINE

(76) Inventor: Eugene I. Moody, 2007, 145 Point Dr. N.W., Calgary, Alberta (CA) T3B 4W1

( * ) Notice: Subject to any disclaimer, the term of this patent is extended or adjusted under 35 U.S.C. 154(b) by 0 days.

(21) Appl. No.: 09/967,945

(22) Filed: Oct. 2, 2001

(65) Prior Publication Data

US 2002/0194846 A1  Dec. 26, 2002

Related U.S. Application Data

(63) Continuation-in-part of application No. 09/885,711, filed on Jun. 20, 2001, now Pat. No. 6,622,735.

(51) Int. Cl.
*F01N 3/00* (2006.01)
(52) U.S. Cl. .......................... 60/320; 60/298
(58) Field of Classification Search .................. 60/274, 60/298, 299, 320
See application file for complete search history.

(56) References Cited

U.S. PATENT DOCUMENTS

| | | | | | |
|---|---|---|---|---|---|
| 2,969,940 | A | * | 1/1961 | Gengler | 60/283 |
| 3,050,376 | A | * | 8/1962 | Bishop et al. | 60/283 |
| 3,232,373 | A | * | 2/1966 | Bjork | 60/283 |
| 3,263,412 | A | * | 8/1966 | Thompson | 60/283 |
| 4,094,645 | A | * | 6/1978 | Bailey | 60/299 |
| 4,289,743 | A | * | 9/1981 | Ruble | 423/450 |
| 4,685,292 | A | * | 8/1987 | Brigham et al. | 60/320 |
| 5,033,264 | A | * | 7/1991 | Cabral | 60/274 |
| 5,335,492 | A | * | 8/1994 | Zirkel | 60/298 |
| 5,477,676 | A | * | 12/1995 | Benson et al. | 60/303 |
| 6,062,304 | A | * | 5/2000 | Kremer et al. | 165/157 |
| 6,095,240 | A | * | 8/2000 | Hassanein et al. | 165/174 |
| 6,151,891 | A | * | 11/2000 | Bennett | 60/320 |
| 6,178,744 | B1 | * | 1/2001 | Perset | 60/298 |
| 6,296,050 | B1 | * | 10/2001 | Brinck, II | 165/158 |
| 6,374,598 | B1 | * | 4/2002 | Neuschwander | 60/298 |
| 6,647,711 | B1 | * | 11/2003 | Spiegel et al. | 60/288 |

* cited by examiner

*Primary Examiner*—Thomas E Denion
*Assistant Examiner*—Diem Tran
(74) *Attorney, Agent, or Firm*—Young Basile

(57) ABSTRACT

Heat recovery for internal combustion engine, includes introducing a first fluid into heat exchanging element, and withdrawing the heated first fluid from the heat exchanger elements; and supplying at least one second fluid which is used during the operation of the internal combustion engine and is heated, so as to flow outside and in contact with the heat exchanging elements to transfer heat through walls of the heat exchanging element from the second fluid to said first fluid.

6 Claims, 13 Drawing Sheets

US 7,574,858 B2

METHOD OF AND SYSTEM FOR HEAT RECOVERY FOR AN INTERNAL COMBUSTION ENGINE

CROSS-REFERENCE TO A RELATED APPLICATION

This application is a continuation-in-part of application U.S. patent application Ser. No. 09/885,711, filed Jun. 20, 2001, now U.S. Pat. No. 6,622,735.

BACKGROUND OF THE INVENTION

The present invention relates to a method of and system for heat recovery for an internal combustion engine.

Although the efficiency of the internal combustion engine has been improved remarkably in the past 50 years, it is still difficult to operate such an engine with an efficiency of over 35%. The efficiency drops off dramatically as an engine ages and may deteriorate to less than 10% if it has been improperly maintained. With only 10-35% efficiency, this means that the remaining fuel consumption creates heat which therefore is largely unused. Thus, the waste heat from internal combustion engines is considerable and is not being used constructively. Some solutions directed to this objective are disclosed for example in U.S. Pat. Nos. 4,378,336, 5,035,867, 5,250,489, 5,711,071, 5,869,011, 5,987,885 and 6,039,913; and Canadian patent Nos. 2,184,632 and 2,247,759. It is believed that the use of heat in the internal combustion engine can be further improved.

SUMMARY OF THE INVENTION

Accordingly, it is an object of the present invention to provide an improved method of and system for heat recovery for an internal combustion engine.

In keeping with these objects and with others which will become apparent hereinafter, one feature of the present invention resides, briefly stated, in a method for heat recovery for an internal combustion engine, which includes introducing a first fluid into heat exchanging elements of a heat exchanger for heating the first fluid, and withdrawing the heated fluid from the heat exchanger elements; and supplying at least one second fluid which is used during the operation of the internal combustion engine and is heated, so as to flow outside and in contact with said heat exchanging elements to transfer heat through walls of said heat exchanging elements from said second fluid to said first fluid.

In accordance with another feature of the present invention, the system for heat recovery is proposed, which has a heat exchanger including a plurality of heat exchanging elements; means for introducing a first fluid into said heat exchanging elements for heating in the first fluid, and withdrawing the heated first fluid from the heat exchanger elements; and supplying at least one second fluid which is used during the operation of the internal combustion engine and is heated, so as to flow outside and in contact with said heat exchanging elements to transfer heat through walls of said heat exchanging element from the second fluid to said first fluid.

When the method is performed and the system is designed in accordance with the present invention, heat produced during the operation of the internal combustion engine is efficiently utilized.

The novel features, which are considered as characteristic for the present invention, are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
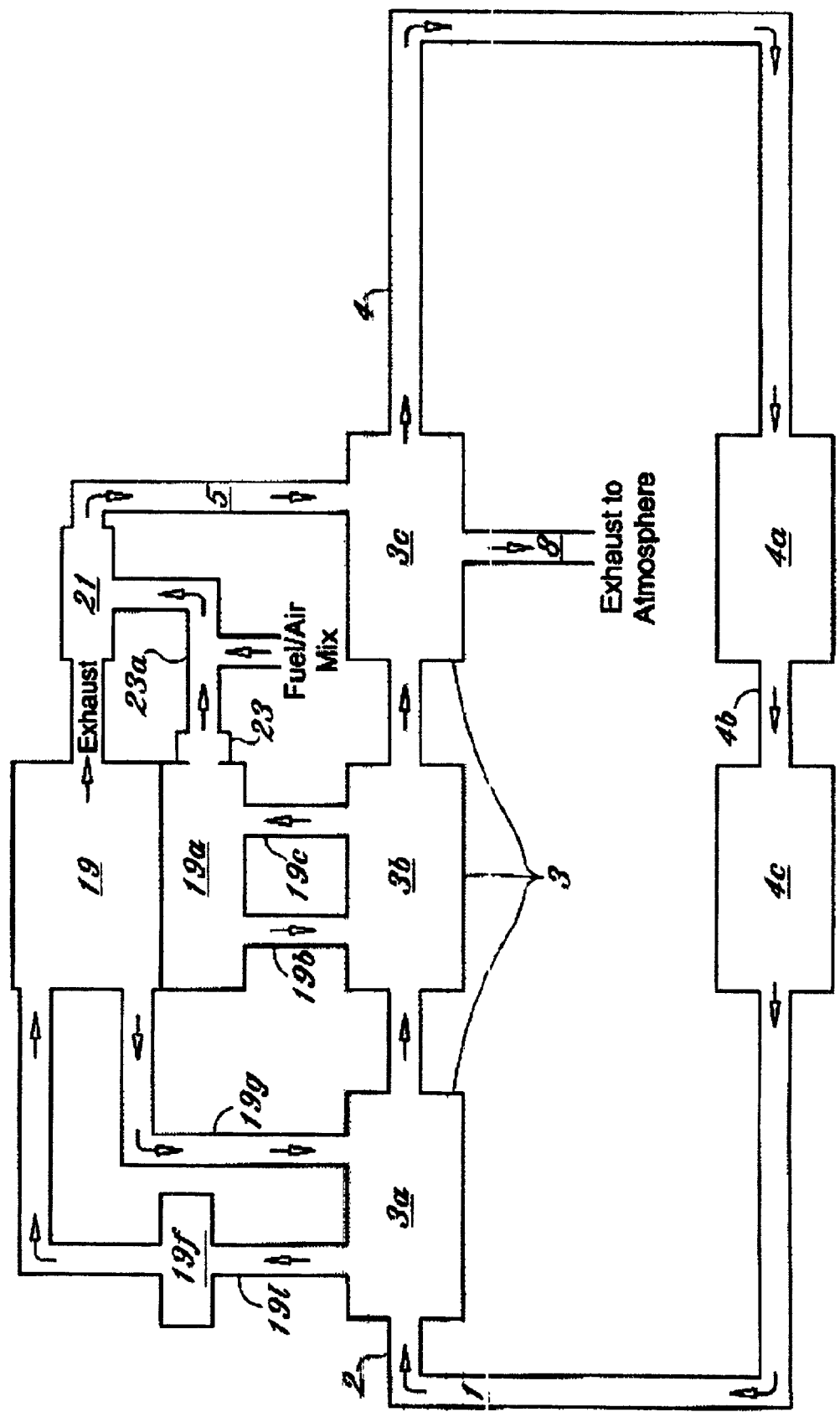
FIG. 1 is a view illustrating schematically a method of and a system for heat recovery for an internal combustion engine.

A system for heat recovery, which operates in accordance with an inventive heat recovery method is illustrated in FIG. 1. Reference numeral 19 identifies an internal combustion engine and reference numeral 19a identifies a crankcase of the engine. A lubricant discharge line 19b extends from the engine to a heat exchanger and in particular to a heat exchanger area 3b, while a lubricant return line 19c extends from the heat exchanger area 3b back to the engine. A coolant discharge line 19g extends from the engine to the heat exchanger and in particular to the heat exchanger area 3a, while a coolant return line 19l extends from the heat exchanger area 3a to an engine radiator 19f. An exhaust gas discharge line 5 extends from the engine to the heat exchanger and in particular to a heat exchanger area 3c and an exhaust gas discharge line 8 extends from the heat exchange area 3c to atmosphere.

The heat exchanger has a plurality of heat exchanging elements (tubes) or a tube bundle 3. A first fluid which can be, for example, cold water or a motive fluid is introduced into the heat exchanger through a first fluid supply line 1 into an interior of the tubes 3, and exits from the tubes 3 through a first fluid discharge line 4. It is then delivered to a first fluid application area 4a which can be formed, for example, as a turbine which drives a generator. Then, through discharge line 4b it is connected to a fluid pump 4c which pumps the first fluid through the line 1 again into the tubes of the heat exchanger 3. The heat exchanger 3 has the above-described heat exchanger areas 3a, 3b, and 3c.

The crankcase 19a is provided with a crankcase vent 23 with a vent line 23a which leads to a venture 21, which draws the crankcase fumes into the engine exhaust pipe 5.

During the operation of the internal combustion engine the first fluid is circulated through the interior of the pipes of the heat exchanger 3 while the second fluid which is a fluid selected from the group consisting of a coolant, a lubricant, an exhaust or alternatively, two of these fluids or all three of these fluids. The second fluid is also supplied to the heat exchanger so as to be in contact with an outer surface of the tubes and to transfer the heat through the wall of the tubes to the first fluid inside the tubes.

The tubes in the heat exchanger area 3c can be coated with a variety of catalytic compounds, which can cause some of the constituents of the gas to react with oxygen and in the process release heat. The combination of the heat from the exhaust gas and the heat released from the catalytic process is transferred through the walls of the heat exchanging elements to the first fluid inside the tubes.

Figure 2:
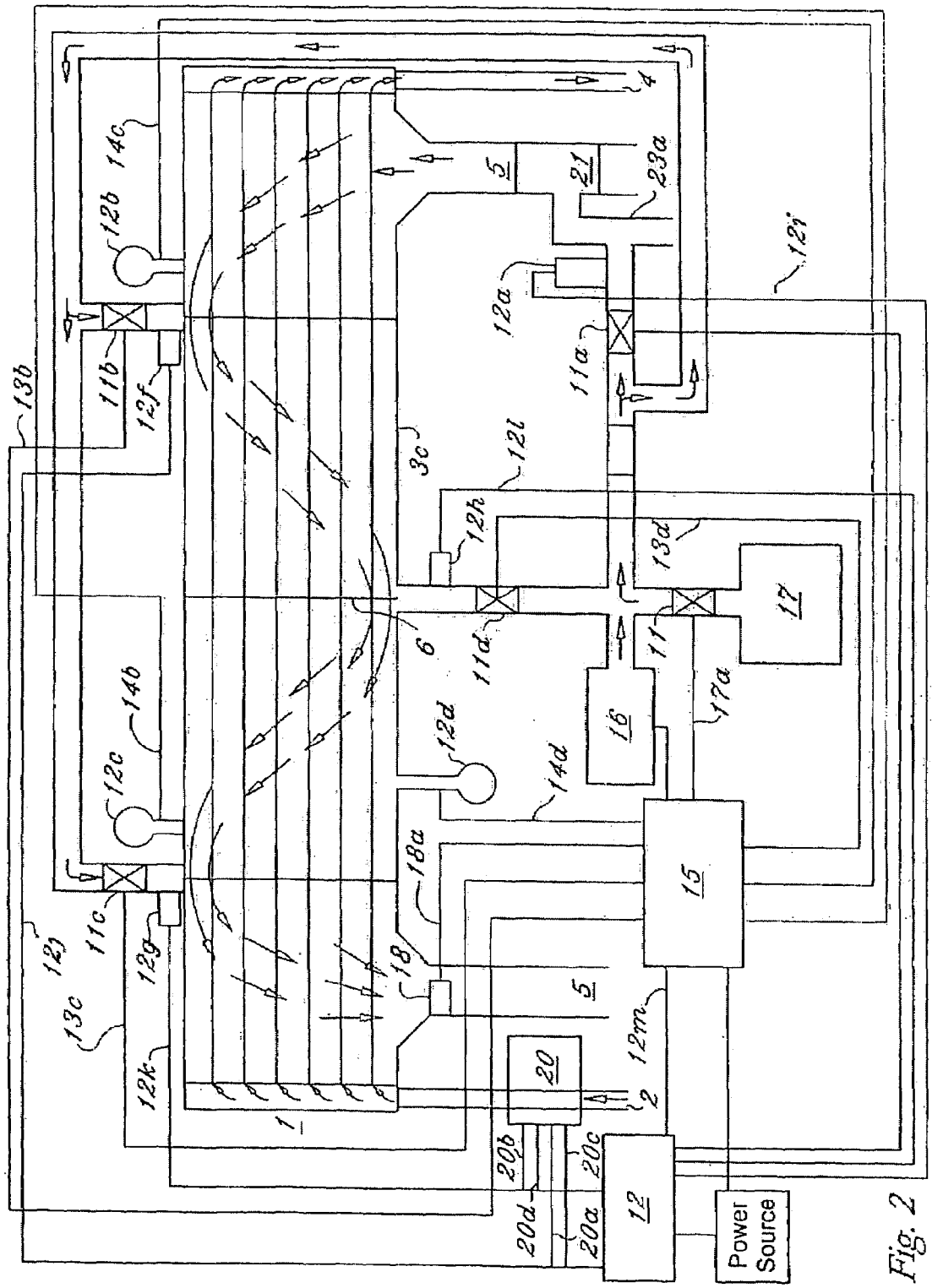
FIG. 2 is a view showing a heat exchanger of the inventive system.

As shown in FIG. 2, electrically controlled valves 11, 11a, 11b, 11c, 11d are provided for delivery of air and/or fuel through a heat exchanger housing 3c to various heat exchange areas and to the crankcase vent 23a from an air pump 16 and a pressurized fuel supply 17. This will dilute heavy materials within the system making the process more efficient. The electronically controlled valves control the flow of air and/or fuel by way of signals sent by a microprocessor 15 through valve control wires 13b, 3c, 13d and 17a. This is in response to information fed to the microprocessor 15, which controls the air pump 16, from temperature sensors 12b, 12c, 12d and a gas constituent sensor 18 by way of sensor wires 14b, 15c, 14e, 18a.

Figure 3:
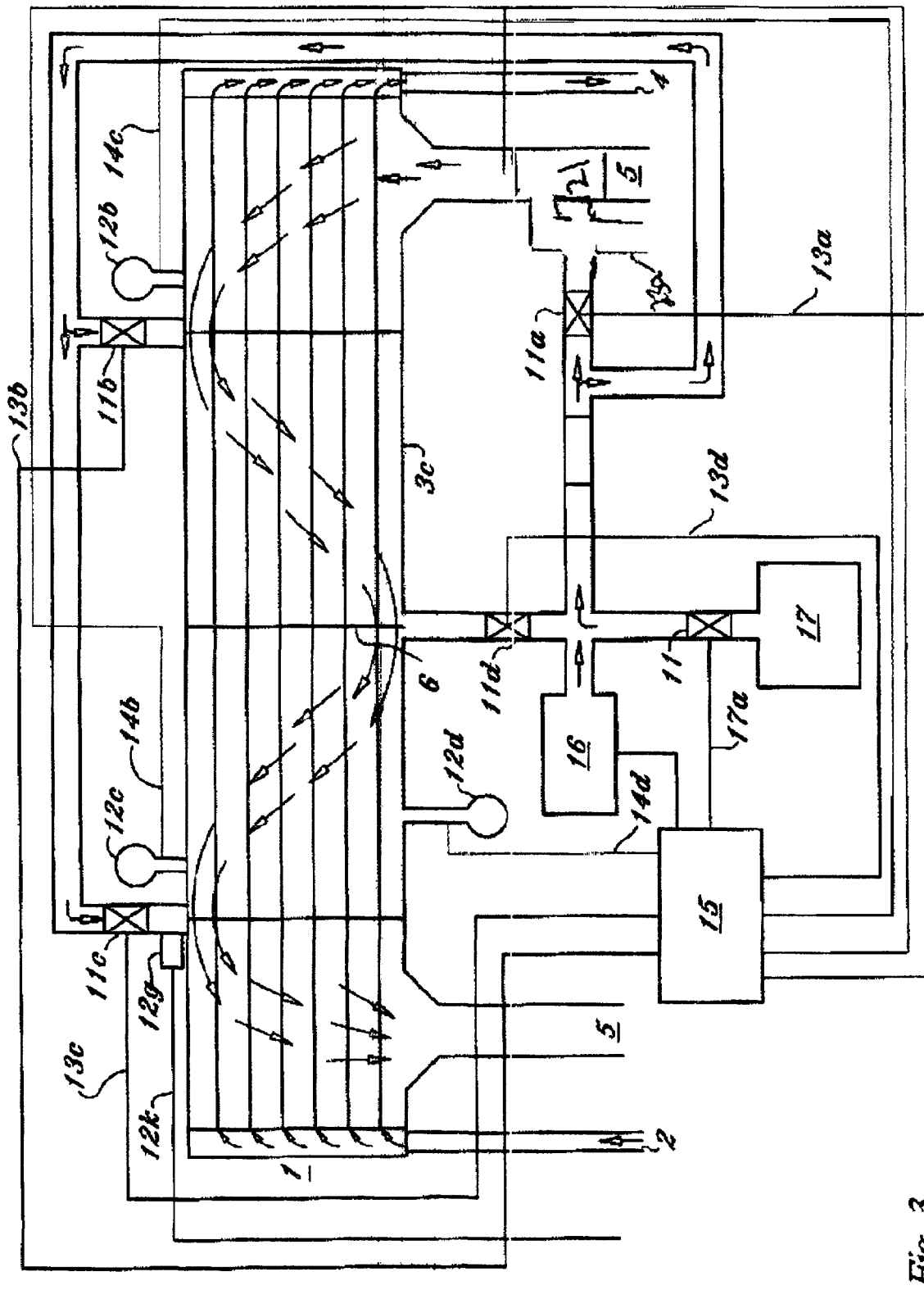
FIG. 3 is a view showing additional components of the inventive system.

FIGS. 2 and 3 shows ignitors 12a, 12g, 12f, 12h, which are located downstream of the valves 11a, 11b, 11c, 11d. They are activated by an ignition power source 12 after having received the signal to do so from the microprocessor 15 through the wire 12m. The microprocessor activates the ignitors 12a, 12f, 12g, 12h through ignition wires 12i, 12j, 12k, 12l in response to signals received from temperature sensors 12b, 12c, 12d, the gas constituents sensor 18, by temperature sensor wires 14b, 14c, 14d and the gas constituents wire 18a.

As mentioned above, in accordance with the present invention, a mixture of hydrocarbon fuel, such as propane and air can be introduced into the discharge stream exiting the crankcase.

Figure 4:
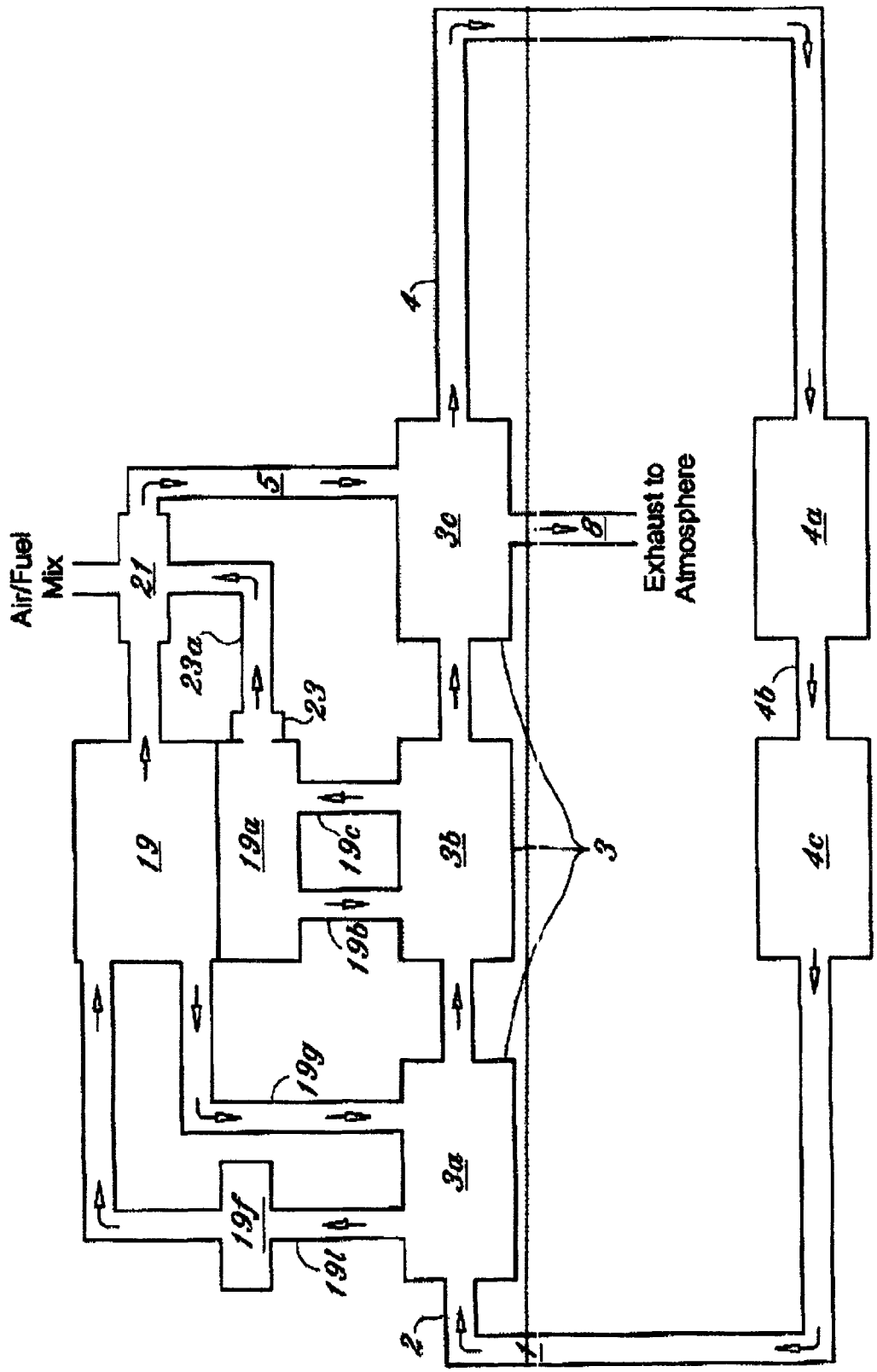
FIGS. 4-13 show further embodiments of the present invention.
Figure 5:
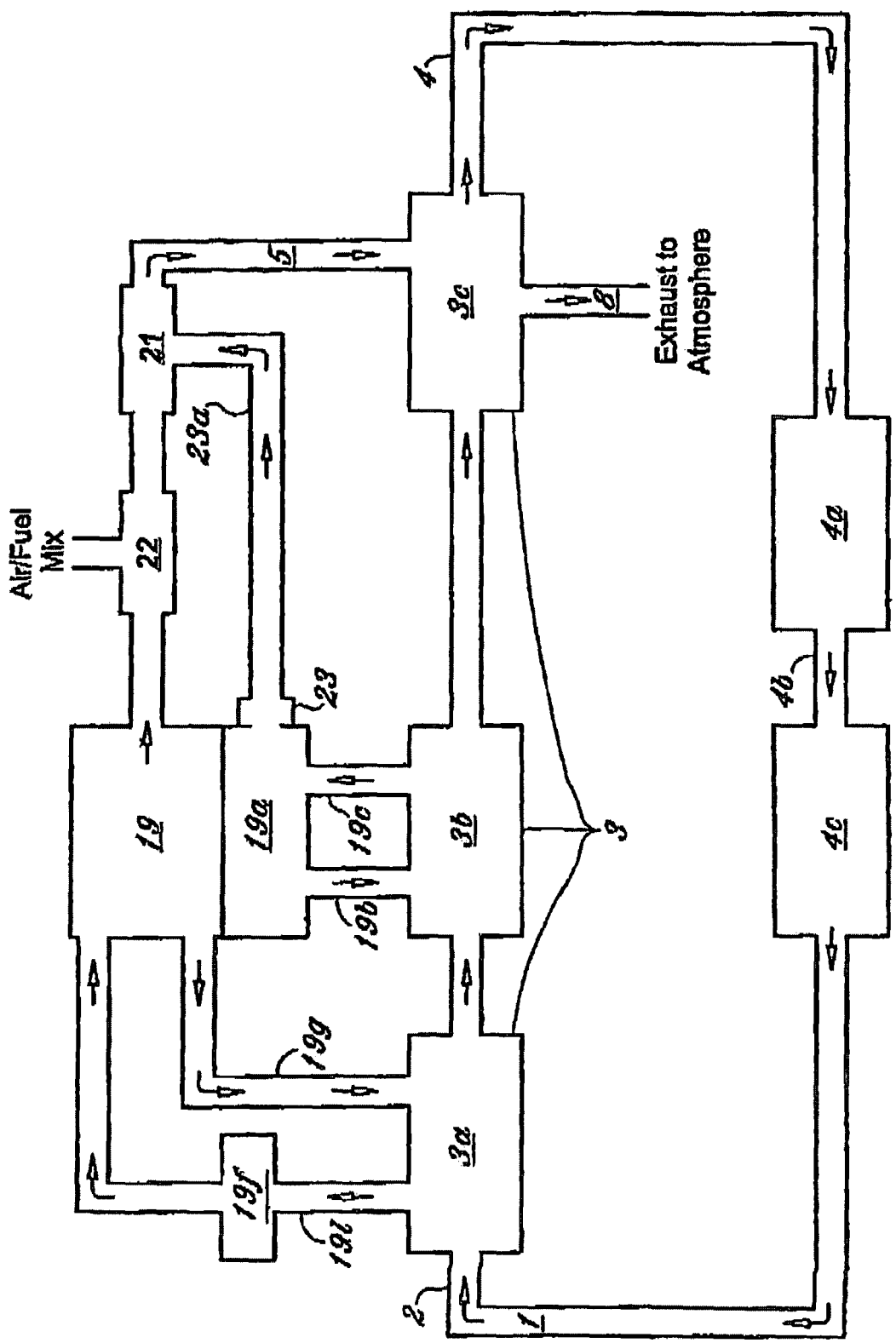
Figure 6:
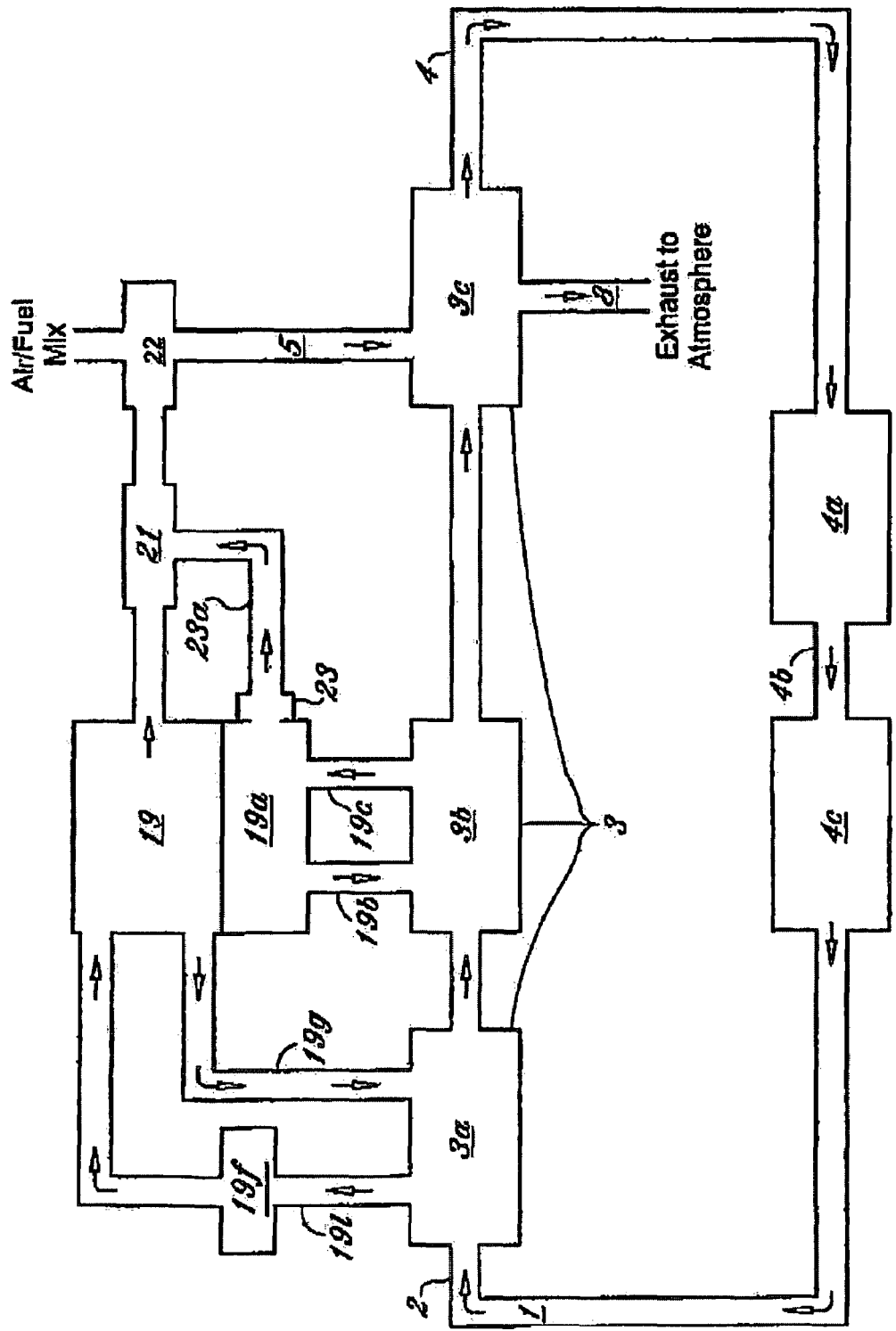
Figure 7:
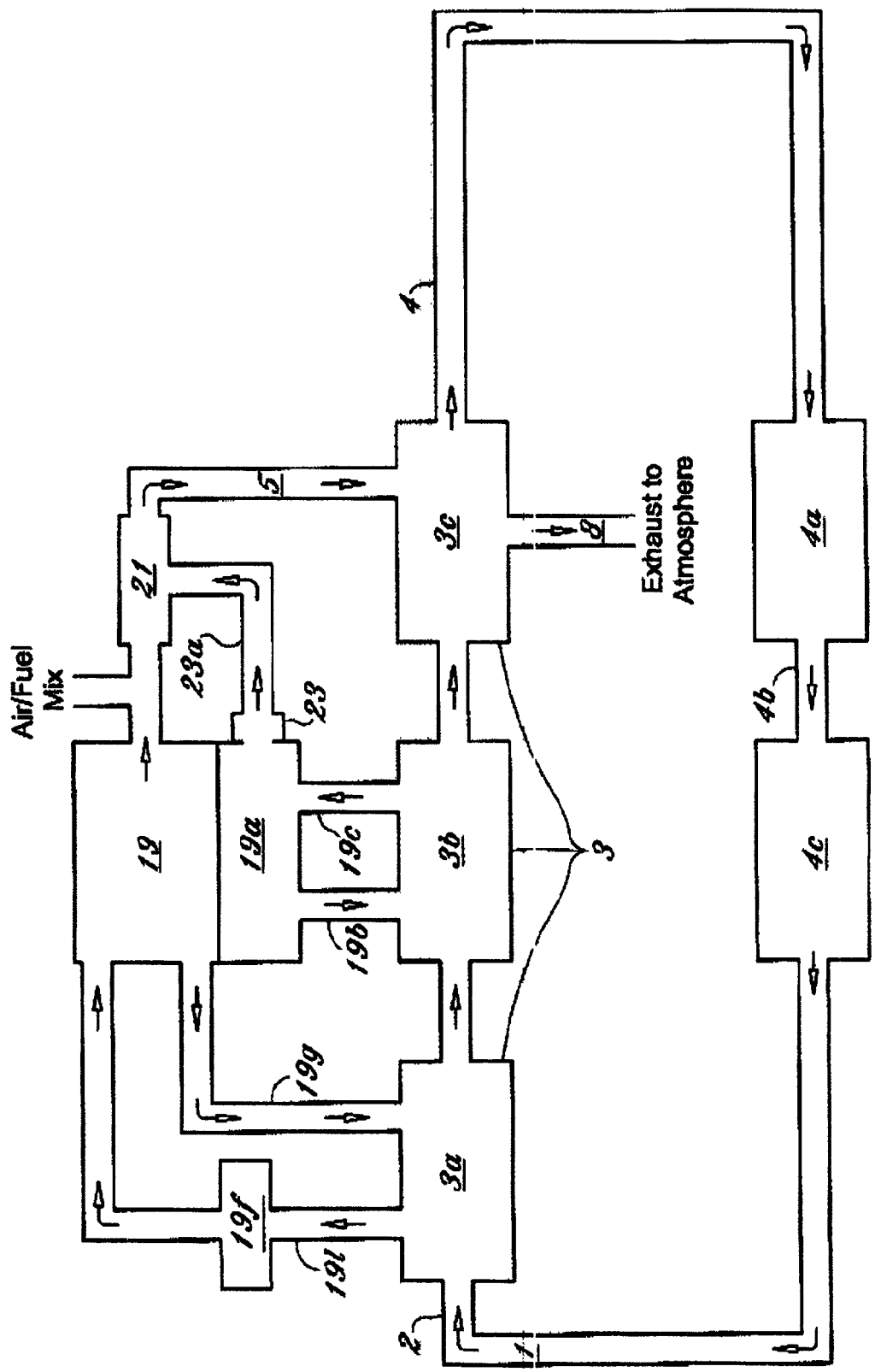
Figure 8:
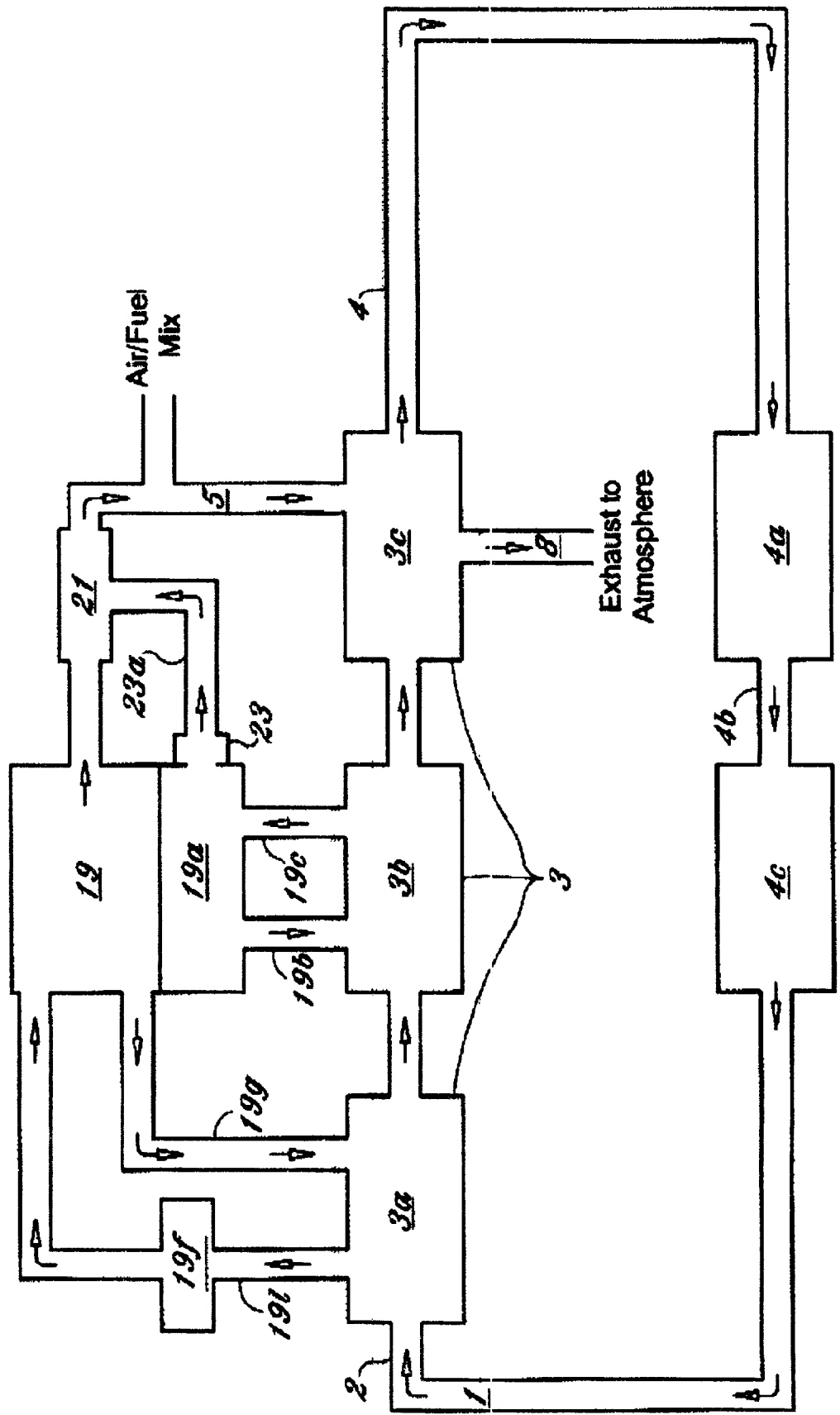
Figure 9:
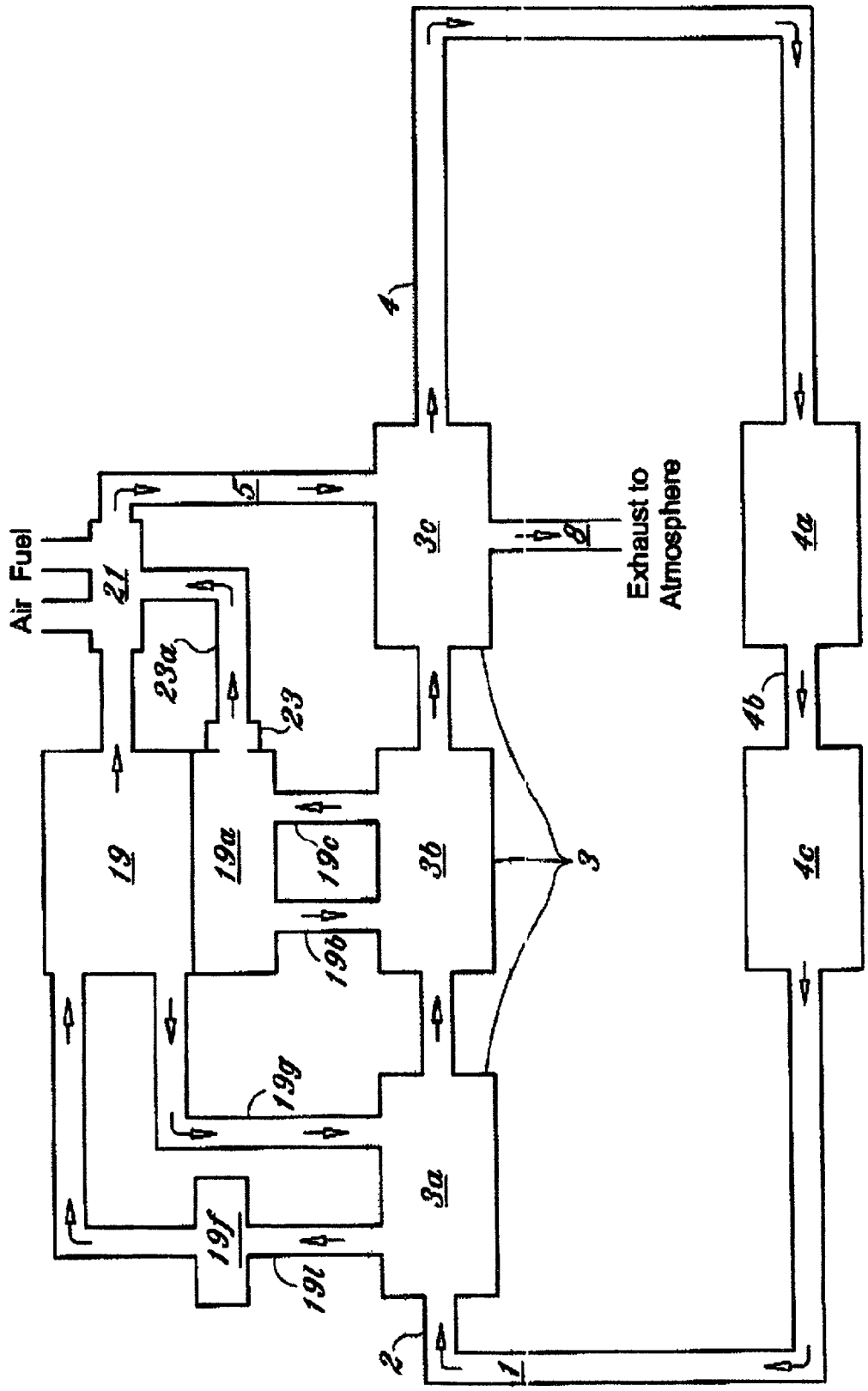
Figure 10:
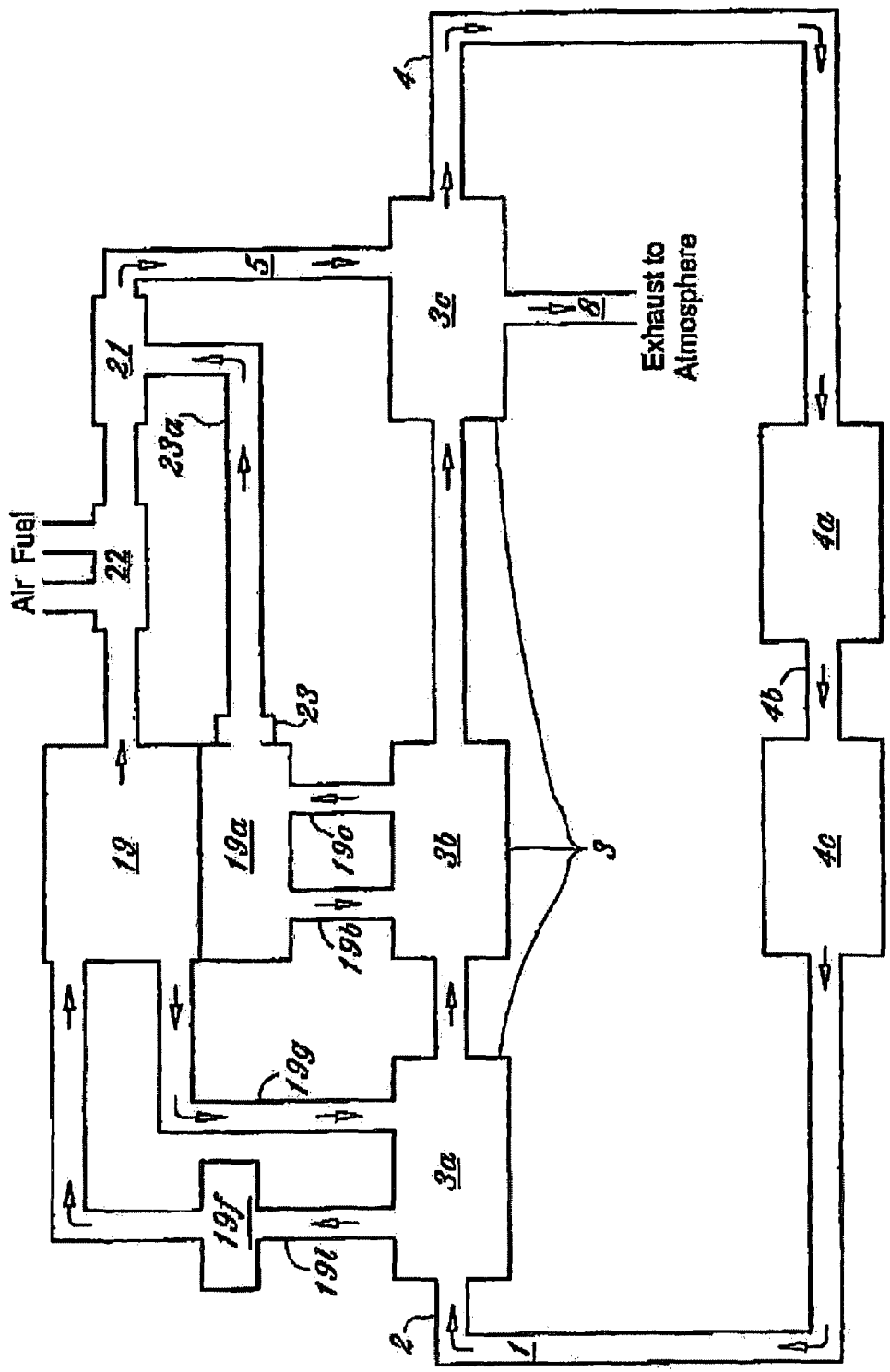
Figure 11:
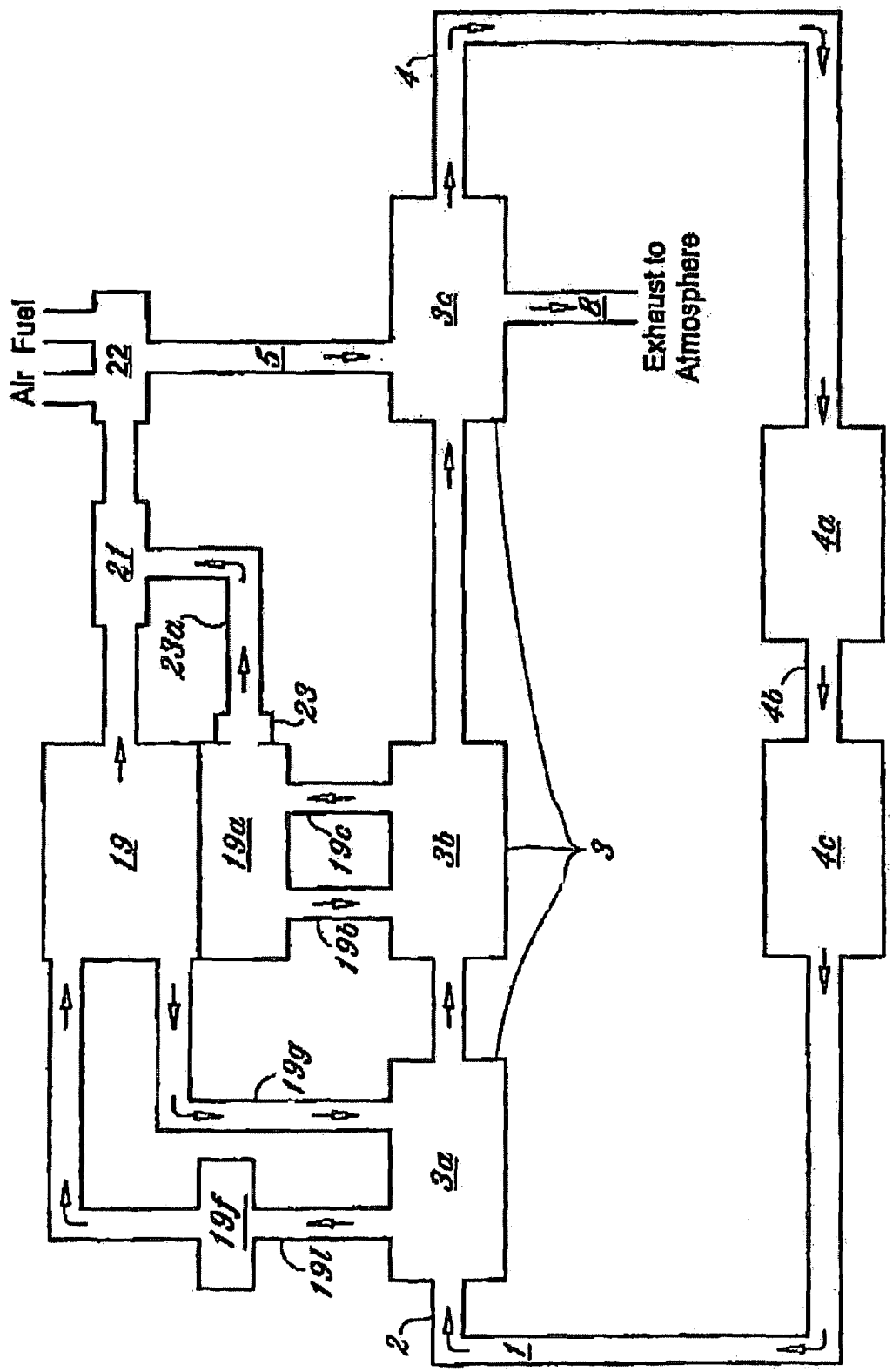
Figure 12:
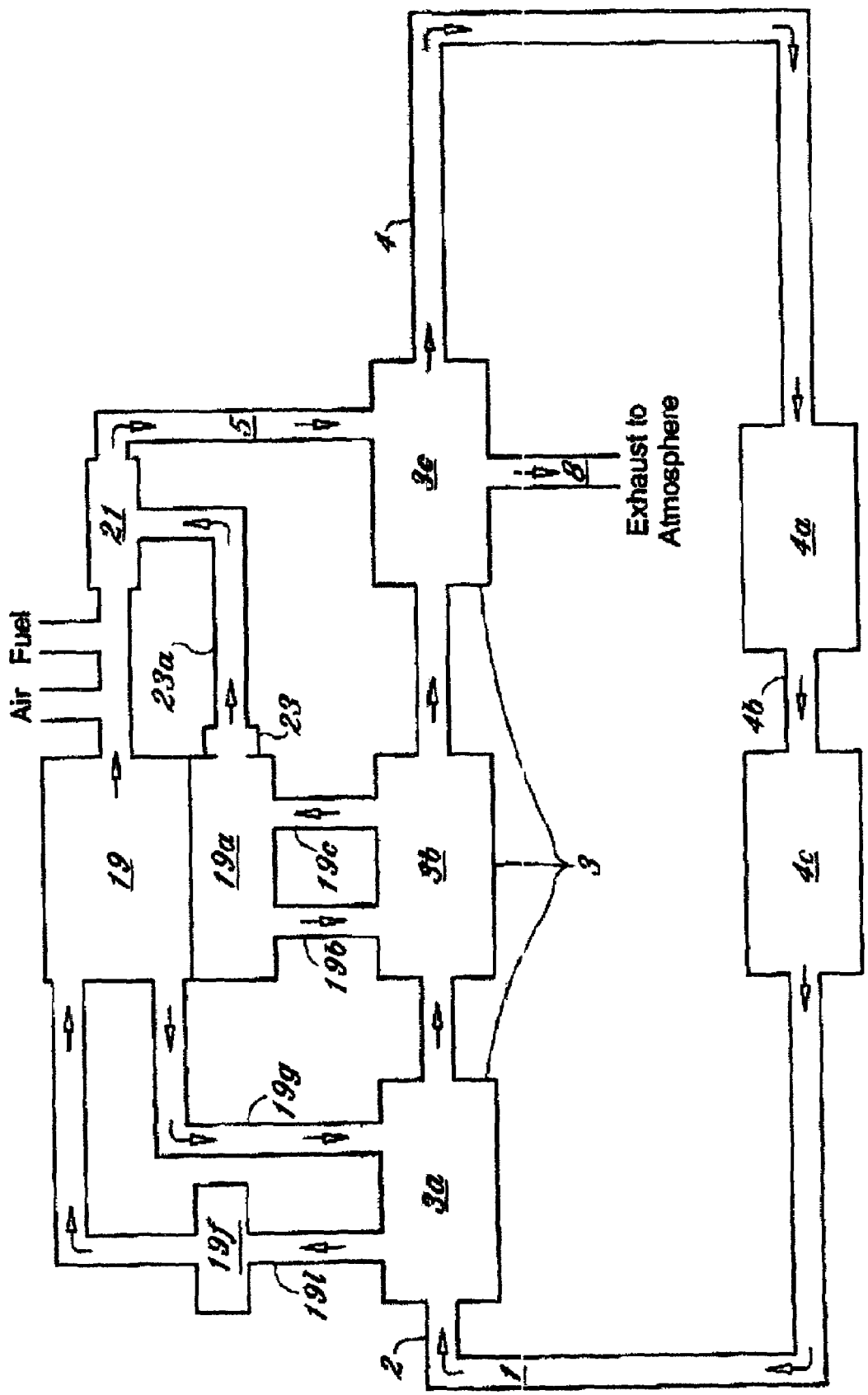
Figure 13:
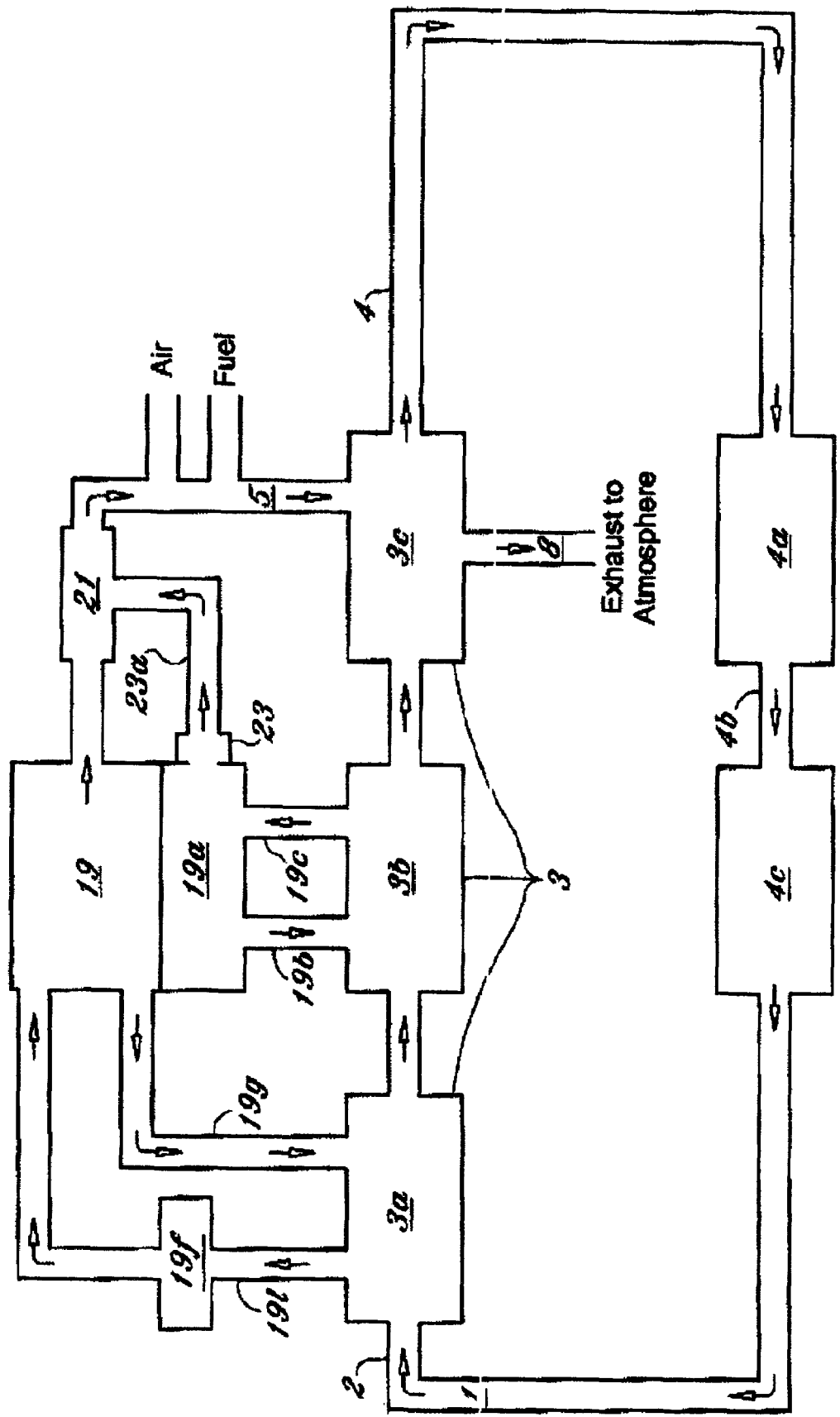

Air fuel mixture can also be effectively introduced into the stream in addition to that discussed above according to any one of the following alternatives:
 directly into venturi 21 (FIG. 4);
 in line 5 through a second venture 22 upstream of venture 21 (FIG. 5); in line 5 through a second venture 22 downstream of venture 21 (FIG. 6);
 in line 5 upstream of F*igure* 21 (FIG. 7); or
 in line 5 downstream of venture 21 (FIG. 8);

It is also possible to introduce the fuel and air in two separate lines. A line of fuel and a line of air may be introduced into the discharge stream in according to any one of the following alternatives:
 directly into venturi 21 (FIG. 9);
 in line 5 through a second venturi 22 upstream of venturi 21 (FIG. 10);
 in line 5 through a second venturi 22 downstream of venturi 21 (FIG. 11);
 in line 5 upstream of venturi 21 (FIG. 12); or
 in line 5 downstream of venturi 21 (FIG. 13).

It will be understood that each of the elements described above, or two or more together, may also find a useful application in other types of methods and constructions differing from the types described above.

While the invention has been illustrated and described as embodied in a method of and system for heat recovery for an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A system for heat recovery for an internal combustion engine comprising:
 a heat exchanger operably connected to a coolant system, a lubricant system and exhaust system of an internal combustion engine through coolant piping, lubricant piping and exhaust piping respectively, the heat exchanger including a first fluid side and a second fluid side:
  i. the first fluid side having piping to receive heat from the second fluid side;
  ii. the second fluid side containing a portion of the coolant piping, lubricant piping and exhaust piping;
 wherein the exhaust system piping includes a catalyst coated to the exhaust system piping within the second fluid side and the exhaust system piping further includes an air/fuel injector system for introducing additional air/fuel into the exhaust system piping to enhance catalytic combustion of exhaust gas.

2. The system as in claim 1 further comprising: a control system including a microprocessor for operative control of at least one exhaust system valve between the air/fuel injector system and exhaust piping for controlling the flow of air/fuel into the exhaust piping.

3. The system as in claim 2 further comprising: at least one gas constituent sensor operatively connected to the microprocessor and exhaust system piping for obtaining gas constituent data for controlling the at least one exhaust system valve.

4. The system as in claim 3 further comprising: at least one gas ignitor operably connected to the exhaust piping between the at least one exhaust system valve and the catalyst.

5. The system as in claim 4, wherein the at least one gas ignitor is operatively connected to the microprocessor.

6. The system as in claim 2 further comprising: at least one temperature sensor operably connected to the second side and the microprocessor.

* * * * *